June 16, 1959     H. I. JOHNSON     2,890,618
CAMERA TRIGGER AND LENS TURRET INTERLOCK
Filed June 9, 1954
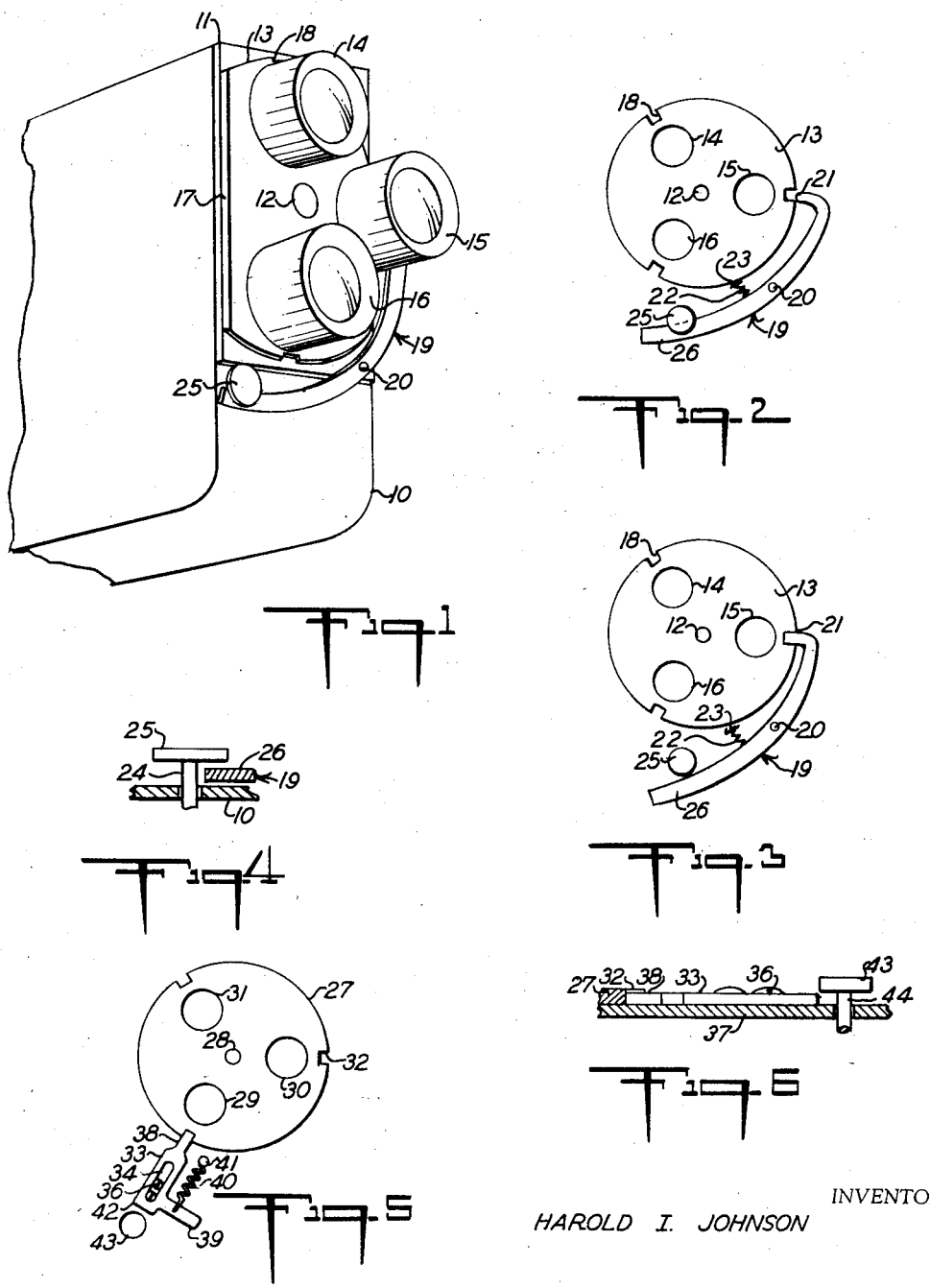
INVENTOR
HAROLD I. JOHNSON
BY *Herbert J. Jacobi*
ATTORNEY pattern# United States Patent Office 2,890,618
Patented June 16, 1959

2,890,618

CAMERA TRIGGER AND LENS TURRET INTERLOCK

Harold I. Johnson, Newport Beach, Calif.

Application June 9, 1954, Serial No. 435,494

6 Claims. (Cl. 88—16)

This invention relates to photography and more particularly to an extremely simple interlocking mechanism to prevent exposure of film while the lens turret of a camera is displaced from picture taking position.

As is well known many cameras particularly of the moving picture variety are provided with turrets for supporting a plurality of different lenses any one of which may be conveniently moved into picture taking position in order to accommodate the camera to a wide variety of conditions and to preclude the necessity of replacing individual lenses should the particular lens on the camera be not suitable for the particular picture to be taken. These motion picture cameras are provided with a trigger or button for initiating operation of the film transport and shutter operating mechanism and heretofore, no simple means has been provided for preventing operation of this trigger when the lens supporting turret is displaced from a normal picture taking position. Frequently it is necessary to move the lens turret to select a particular lens in somewhat of a hurry and at such times it is extremely easy to inadvertently release the camera trigger and consequently a certain portion of the film may be exposed and consequently spoiled with the lenses displaced from picture taking positions. Even though the turret may provide a light-proof joint and thus prevent inadvertent exposure of the film, nevertheless release of the trigger when the turret is in a position with the lens out of alignment with the picture taking position, or during movement of the turret, film will run through the camera and be wasted just the same as if it had been inadvertently exposed.

It is accordingly an object of this invention to provide a simple interlocking mechanism for preventing operation of a movie camera and consequent inadvertent exposure or waste of film when a lens carrying turret is displaced from picture taking position.

A further object of the invention is the provision of a simple interlocking mechanism for moving picture cameras to prevent inadvertent operation of the camera and spoilage of film due to displacement of the lens supporting turret, which mechanism may be conveniently applied to existing moving picture cameras.

A still further object of the invention is the provision of a simple interlocking mechanism to prevent inadvertent taking of pictures or spoilage of film in a moving picture camera when the turret supporting lens is displaced from picture taking position, which mechanism may be applied to existing cameras without the necessity of in any way modifying such cameras or the operating mechanism or control means therefor.

Another object of the invention is the provision of a simple interlocking means for moving picture cameras which will operate to lock a lens supporting turret in operative position and also to prevent operation of the camera mechanism when such turret is displaced from normal picture taking position.

Further objects and advantages of the invention will be apparent from the following description taken in conjunction with the accompanying drawing wherein:

Fig. 1 is a fragmentary view in perspective showing a conventional moving picture camera with the interlocking mechanism of this invention installed thereon and in the position occupied for preventing operation of the camera;

Fig. 2, a fragmentary front elevational view of a circular type of lens supporting turret with the interlocking means of this invention in a position to prevent operation of the camera mechanism and with the turret displaced from normal picture taking position;

Fig. 3, a view similar to Fig. 2, but showing the interlocking mechanism of this invention locking the turret in picture taking position and clear of the camera trigger to permit normal picture taking operation of the camera;

Fig. 4, a fragmentary elevational view with parts in section for greater clarity and showing the manner in which the interlocking mechanism of this invention cooperates with the camera trigger to prevent inadvertent operation thereof;

Fig. 5, a fragmentary front elevational view of a circular type of lens supporting turret with a modified form of interlocking means; and Fig. 6, a fragmentary elevational view with parts in section for greater clarity and showing the manner in which the modified form of interlocking mechanism shown in Fig. 5 cooperates with the camera trigger to prevent inadvertent operation thereof.

With continued reference to the drawing there is shown a moving picture camera of more or less conventional type having a body 10 to the front face of which there is attached a lens board 11. Rotatably mounted on the lens board 11 by means of a pivot pin or other suitable means 12 is a lens supporting turret 13 which may serve to carry lenses 14, 15 and 16 which may be of different types in order to adapt the camera to varying conditions and for taking different types of pictures. The turret 13 may in one form of the invention be provided with a straight edge 17 which with the turret in one position as shown, will coincide with the side edge of the body 10, or the turret 13 may as shown in Figs. 2 and 3, be circular in formation, in which case a portion thereof would extend outwardly from the side of the body 10 or if applied to other types of cameras, would be within the confines of the body depending upon the particular configuration thereof.

The lens supporting turret 13 is supplied with notches 18 which are designed to cooperate with a locking means for locking the turret 13 in position with the selected lens 14, 15 or 16 in picture taking position. The interlocking mechanism of this invention is designed to cooperate with the notches 18 in the lens supporting turret 13 and may be utilized either in conjunction with the turret locking means provided on the camera or may be substituted for such locking means and will serve the dual purpose of locking the turret 13 in picture taking position, and at the same time, when the turret is displaced from picture taking position will prevent inadvertent operation of the camera mechanism, thus preventing the inadvertent spoilage of film.

The interlocking mechanism of this invention may well comprise a lever 19 curved to fit the particular camera involved and to clear the lens turret 13. The lever 19 may be pivotally mounted as at 20 on the lens board 11 or other convenient portions of the camera and one end of the lever 19 is provided with a curved portion forming a locking pawl which may engage in one of the notches 18, in the lens supporting turret 13. As shown in Fig. 3, engagement of the pawl 21 in a notch 18 will prevent rotation of the turret 13 and since the notches 18 are located with relation to the lenses 14, 15 and 16, engagement of the pawl 21 in a notch 18 will automatically position a selected lens in picture taking position.

The locking lever 19 is urged toward turret locking position with the pawl 21 in engagement with a notch 18 by a compression spring 22, one end of which may engage the lever 19 and the opposite end engage an abutment 23 secured to the lens board 11 or other convenient portion of the camera. Of course, if desired, the compression spring 22 may be replaced by a suitable coil spring surrounding the pivot 20 in which case the same would be positioned in such a manner as to urge the pawl 21 into engagement with a notch 18 of the lens supporting turret 13.

The body 10 of the camera is provided with a trigger for initiating operation of the camera mechanism, which trigger may be comprised of a forwardly projecting rod 24 on the forward end of which is fixed a knob or finger engaging portion 25. In order to initiate operation of the camera mechanism it is necessary to engage the knob 25 by the finger of the operator and depress the same toward the body of the camera at which time, assuming a lens to be in proper picture taking position, the film will be exposed to take such picture.

The interlocking mechanism of this invention will prevent inadvertent depression of the knob 25 and consequent spoilage of film in the camera when the lens turret 13 is displaced from normal picture taking position and as shown in Figs. 1 and 2, the end 26 of the lever 19 remote from the pawl 21 extends in such a manner, that when the pawl 21 is disengaged from a notch 18, the end 26 of the lever 19 will be positioned beneath the finger engaging knob 25 as shown in Figs. 2 and 4 and will thus prevent depression of such knob and consequent operation of the camera mechanism. Upon movement of the lens supporting turret 13 to a position where the pawl 21 will engage in a notch 18, the end 26 of the lever 19 will move from beneath the knob 25, as shown in Fig. 3, and thus permit normal operation thereof to initiate operation of the camera mechanism.

It will thus be seen that by the above described invention there has been provided a relatively simple interlocking mechanism which by operation thereof, by the hand of the operator will release the lens supporting turret 13 for rotation and when such turret has been properly positioned to locate a lens in picture taking position, release of the lever 19 will permit engagement of the pawl 21 with a notch 18, thus locking the lens turret 13 in picture taking position and permitting the end 26 of the lever 19 to clear the trigger knob 25, thereby permitting normal operation of the camera. The pawl 21 will operate to lock the turret 13 in picture taking position, but if desired, the normal locking means provided on the camera may also be utilized provided the same engages a different notch from that engaged by the pawl 21, in which case it would be necessary, of course, to release both locking means in order to permit rotation of the turret 13 to position a desired lens in picture taking position.

In the modified form of interlocking mechanism shown in Figs. 4 and 5 a lens turret 27 is rotatably mounted at 28 on the camera body and the turret 27 is provided with lens openings 29, 30 and 31. The turret 27 is also provided with locking notches 32, there being a notch corresponding to each lens opening.

The modified form of interlocking means may comprise an elongated bar 33 provided with an elongated slot 34 for receiving screw-threaded fastening means or the like 36 engaging the body or front plate 37 of the camera to slidably secure the bar 33 in place thereon. The inner end of the bar 33 is reduced to provide a locking pawl 38 which, as shown in Fig. 5, may selectively engage in the notches 32 of the turret 27.

The locking bar 33 is provided with a laterally extending finger-engaging arm 39 and connected to this arm is a tension spring 40 which may be secured at its opposite end to a pin 41 projecting from the camera body or front plate 37. Spring 40 urges the locking pawl 38 into engagement with the notches 32 in the turret 27.

In operation, when it is desired to rotate the turret 27 to bring a selected lens into picture taking position, the bar 33 and pawl 38 are retracted from the notch 32 by engagement of the finger of the operator with finger-engaging arm 39, and at this time the opposite end 42 of the bar 33 will move beneath the finger-engaging knob 43 of the camera operating trigger 44 to prevent inadvertent depression of the same with consequent operation of the camera mechanism when the turret 27 is displaced from picture taking position.

This modified form of the invention, as will be seen, is very similar in operation to the preferred form described above, but such modified interlocking mechanism may be adaptable to certain types of cameras where the pivoted bar of the preferred form cannot be used.

As will be seen, the interlocking mechanism of this invention is extremely simple, yet obviously will operate to perform the function desired and will prevent inadvertent operation of the camera mechanism whenever the lens turret is displaced from normal picture taking position.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A camera trigger and lens turret interlocking mechanism for use in a camera having a depressible trigger and finger engaging knob for initiating operation of the same and locking notches in a lens turret, said mechanism comprising a lever pivotally mounted on said camera, a locking pawl on one end of said lever for selective engagement in one of said notches to lock said turret in picture taking position, a compression spring engaging said lever and an abutment on said camera for urging said pawl into engagement with said notches, the opposite end of said lever extending beneath said knob to prevent depression of the same and operation of said camera when said pawl is disengaged from the said notches and disposed out of the path of movement of said knob when said pawl is in engagement with one of said notches thereby preventing inadvertent operation of said camera when said turret is displaced from picture taking position and consequent spoilage of film.

2. A camera trigger and lens turret interlocking mechanism for use in a camera having a depressible trigger and finger engaging knob for initiating operation of the same and locking notches in a lens turret, said mechanism comprising a lever pivotally mounted on said camera, a locking pawl on one end of said lever for selective engagement in one of said notches to lock said turret in picture taking position, a compression spring engaging said lever for urging said pawl into engagement with said notches, the opposite end of said lever extending beneath said knob to prevent depression of the same and operation of said camera when said pawl is disengaged from said notches and disposed out of the path of movement of said knob when said pawl is in engagement with one of said notches thereby preventing inadvertent operation of said camera when said turret is displaced from picture taking position and the consequent spoilage of film.

3. A camera trigger and lens turret interlocking mechanism for use in a camera having a depressible trigger and finger engaging knob for initiating operation of the same and locking notches in a lens turret, said mechanism comprising a lever pivotally mounted on said camera, locking means on one end of said lever for selective engagement in one of said notches to lock said turret in picture taking position, a compression spring engaging said lever for urging said locking means into engagement with said notches, the opposite end of said lever extending beneath said knob to prevent depression of the same and operation of said camera when said locking means is disengaged from said notches and disposed out of the path of movement of said knob when said locking means is in engagement with one of said notches thereby preventing inadvertent operation of said camera when said turret is displaced from picture taking position and consequent spoilage of film.

4. A camera trigger and lens turret interlocking mechanism for use in a camera having a depressible trigger and finger engaging knob for initiating operation of the same and locking notches in a lens turret, said mechanism comprising a lever pivotally mounted on said camera, locking means on one end of said lever for selective engagement in one of said notches to lock said turret in picture taking position, resilient means for urging said locking means into engagement with said notches, the opposite end of said lever extending beneath said knob to prevent depression of the same and operation of said camera when said locking means is disengaged from said notches and disposed out of the path of movement of said knob when said locking means is in engagement with one of said notches thereby preventing inadvertent operation of said camera when said turret is displaced from picture taking position and consequent spoilage of film.

5. A camera trigger and lens turret interlocking mechanism for use in a camera having a depressible trigger for initiating operation of the same and locking notches in a lens turret, said mechanism comprising a lever pivotally mounted on said camera, locking means on one end of said lever for selective engagement in one of said notches to lock said turret in picture taking position, resilient means for urging said locking means into engagement with said notches, the opposite end of said lever extending into the path of movement of said trigger to prevent depression of the same and operation of said camera when said locking means is disengaged from said notches and disposed out of the path of movement of said trigger when said locking means is in engagement with one of said notches thereby preventing inadvertent operation of said camera when said turret is displaced from picture taking position and consequent spoilage of film.

6. A camera trigger and lens turret interlocking mechanism for use in a camera having a depressible trigger for initiating operation of the same and a lens turret, said mechanism comprising a lever pivotally mounted on said camera, locking means on one end of said lever for selective engagement with said turret to lock said turret in picture taking position, resilient means for urging said locking means into engagement with said turret, the opposite end of said lever extending into the path of movement of said trigger to prevent depression of the same and operation of said camera when said locking means is disengaged from said turret and disposed out of the path of movement of said trigger when said locking means is in engagement with said turret thereby preventing inadvertent operation of said camera when said turret is displaced from picture taking position and consequent spoilage of film.

References Cited in the file of this patent

UNITED STATES PATENTS

| 636,036 | Goodell et al. | Oct. 31, 1899 |
| 1,893,327 | Howell | Jan. 3, 1933 |
| 2,462,302 | Bolsey | Feb. 22, 1949 |
| 2,687,669 | Bolsey | Aug. 31, 1954 |

FOREIGN PATENTS

| 511,828 | Great Britain | Aug. 24, 1938 |